United States Patent
Wang

(10) Patent No.: US 8,750,356 B2
(45) Date of Patent: Jun. 10, 2014

(54) METHOD, APPARATUS, AND SYSTEM FOR MEASURING ASYMMETRIC DELAY OF COMMUNICATION PATH

(75) Inventor: Song Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 13/406,280

(22) Filed: Feb. 27, 2012

(65) Prior Publication Data

US 2012/0170631 A1 Jul. 5, 2012

Related U.S. Application Data

(63) Continuation of application No. PCT/CN2010/078512, filed on Nov. 8, 2010.

(30) Foreign Application Priority Data

Nov. 27, 2009 (CN) .......................... 2009 1 0188481

(51) Int. Cl.
*H04B 3/46* (2006.01)

(52) U.S. Cl.
USPC ........... 375/224; 375/225; 375/226; 375/227; 375/228; 370/503; 370/508; 370/509

(58) Field of Classification Search
USPC ........................... 375/130, 132; 370/503, 507
See application file for complete search history.

(56) References Cited

U.S. PATENT DOCUMENTS

| 2007/0147562 A1 | 6/2007 | Eidson |
| 2008/0103713 A1 | 5/2008 | Barford et al. |

FOREIGN PATENT DOCUMENTS

| CN | 1968149 A | 5/2007 |
| CN | 101098219 A | 1/2008 |
| CN | 101404618 A | 4/2009 |
| CN | 101425891 A | 5/2009 |
| CN | 101510849 A | 8/2009 |
| CN | 101771467 A | 7/2010 |
| CN | 101873186 A | 10/2010 |
| EP | 1734690 A1 | 12/2006 |
| WO | WO 97/37310 A1 | 10/1997 |
| WO | WO 2007/091760 A1 | 8/2007 |
| WO | WO 2009/082334 A1 | 7/2009 |

OTHER PUBLICATIONS

Office Action issued in corresponding Chinese Patent Application No. 200910188481,2, mailed Nov. 1, 2012.

(Continued)

*Primary Examiner* — Daniel Washburn
*Assistant Examiner* — Eboni Hughes
(74) *Attorney, Agent, or Firm* — Brinks Gilson & Lione

(57) ABSTRACT

A method for measuring the asymmetric delay of a communication path includes: sending, by a first node, a first delay measurement message to a second node whose local clock is synchronized with the first node; receiving, by the first node, a second delay measurement message sent by the second node; calculating, according to time when the first delay measurement message is sent by the first node and time when the second node receives the first measurement message, a communication path delay in a direction towards the second node; calculating, according to time when the second node sends the second delay measurement message and time when the second measurement message is received by the first node, a communication path delay in a direction leaving the second node; and obtaining a measured value of the asymmetric delay of the communication path according to the communication path delays in the two directions.

14 Claims, 4 Drawing Sheets

(56) References Cited

OTHER PUBLICATIONS

Written Opinion of the International Searching Authority issued in corresponding PCT Patent Application No. PCT/CN2010/078512, mailed Feb. 10, 2011.

Extended European Search Report issued in corresponding European Patent Application No. 10832621.6, mailed Apr. 24, 2012.

International Search Report issued in corresponding PCT Patent Application No. PCT/CN2010/078512, mailed Feb. 10, 2011.

Guo et al., "BFD Extensions in Support of Performance Measurement" Network Working Group, Mar. 10, 2009.

IEEE Instrumentation and Measurement Society, "IEEE Standard for a Precision Clock Synchronization Protocol for Networked Measurement and Control Systems" IEEE Std 1588™—Jul. 24, 2008.

Telecommunication Standardization Sector of ITU, "Timing Characteristics of Primary Reference Clocks" Series G: Transmission Systems and Media, Digital Systems and Networks—Digital Transmission Systems—Digital Networks—Design Objectives for Digital Networks. International Telecommunication Union G.811, Sep. 1997.

Telecommunication Standardization Sector of ITU, "Timing Requirements of Slave Clocks Suitable for Use as Node Clocks in Synchronization Networks" Series G: Transmission.Systems and Media, Digital Systems and Networks—Digital Networks—Design Objectives for Digital Networks. International Telecommunication Union G.812, Jun. 2004.

Telecommunication Standardization Sector of ITU, "The Control of Jitter and Wander Within Digital Networks Which are Based on the 2048 kbit/s Hierarchy" Series G: Transmission.Systems and Media, Digital Systems and Networks—Digital Networks—Quality and Availability Targets. International Telecommunication Union, G.823, Mar. 2000.

Office Action issued in corresponding Chinese Patent Application No. 200910188481.2, mailed Jul. 8, 2013, 9 pages.

US 8,750,356 B2

METHOD, APPARATUS, AND SYSTEM FOR MEASURING ASYMMETRIC DELAY OF COMMUNICATION PATH

CROSS-REFERENCE TO RELATED APPLICATIONS

This application is a continuation of International Application No. PCT/CN2010/078512, filed on Nov. 8, 2010, which claims priority to Chinese Patent Application No. 200910188481.2, filed on Nov. 27, 2009, both of which are hereby incorporated by reference in their entireties.

FIELD OF THE DISCLOSURE

The present disclosure relates to the field of network communication, and in particular, to a method, an apparatus, and a system for measuring an asymmetric delay of a communication path.

BACKGROUND OF THE DISCLOSURE

The trend of development shows that networks and services will be developed over the Internet Protocol (IP). A key technology for the evolution of conventional networks based on Synchronous Digital Hierarchy (SDH) to IP-based packet transport networks is to solve the clock and time synchronization in IP packet networks. The conventional Second Generation (2G) wireless telephone technology only requires frequency synchronization and generally obtains a clock synchronization signal through a Time Division Multiplexing (TDM) network of, for example, SDH and Plesiochronous Digital Hierarchy (PDH). In scenarios where the synchronization signal cannot be obtained from the TDM network (PDH or SDH), a Global Positioning System (GPS) is generally used to provide a high-precision synchronous clock reference source. A 3rd Generation (3G) network requires not only a frequency synchronization precision of 500 parts-per-billion (500 ppb) but also a time synchronization precision measured by microseconds. In a Time Division-Synchronous Code Division Multiple Access (TD-SCDMA) network, for example, the required precision of time synchronization is within ±1.5 microseconds. The conventional PDH and SDH networks only provide frequency synchronization. The Network Time Protocol (NTP) technology only provides a time synchronization precision measured by milliseconds. These obviously do not meet the technical requirements of 3G networks. In addition, as the investment in network infrastructure gradually drops, the expensive GPS service is not a best solution. Therefore, the Precision Time Protocol (PTP) gradually becomes the mainstream time synchronization standard in the industry.

According to the PTP protocol, timing messages are exchanged between master and slave devices to implement time synchronization. If asymmetric delays exist in the sending and receiving communication paths, the synchronization precision becomes worse because of the asymmetric delays. In the telecommunication field, most communication paths are connected through optional fibers. In engineering, it is hard to keep the sending and receiving fibers strictly symmetric.

The delay caused by a 1-meter fiber is about 4.86 ns. According to the PTP protocol, the synchronization error equals ½ of the asymmetric delay of the sending and receiving fibers. Therefore, the asymmetry of a 500 m fiber will cause a time synchronization error of about 1,215 ns. This is already likely to affect the time synchronization in a 3G network.

Although the PTP protocol defines the asymmetric model of the communication path delay and provides a method for compensation in a Correction Field, the protocol does not define how to measure the asymmetry of such transmission delays. Wireless technologies require a very high time synchronization precision. The delay error caused by the asymmetry of fibers has a great adverse impact on the time synchronization precision of PTP. Therefore, the asymmetry of fibers must be considered in engineering implementation. Most fibers were laid years ago when the asymmetry of filers was generally not considered. Even in the case of new fibers, it is still hard to keep the fibers symmetric in terms of engineering. If the asymmetry of fibers cannot be solved, the large-scale commercial use of PTP will be seriously affected.

A method for measuring the delay caused by the asymmetry of communication paths in a prior art uses the GPS or an Optical Time Domain Reflectometer (OTDR) to perform measurements point by point and compensates the asymmetry according to the measurement results. This method requires an on-site measurement at every site. The workload is huge. Moreover, when the GPS is used for the measurement, satellites must be within the vision of the receiver. If a NodeB is deployed in a basement or subway station where GPS antennas are hard to install, the implementation is very difficult and the cost is high. The operations on an OTDR are complicated and require high skills of the operator. With the above measurement method, when a broken fiber is reconnected through welding, the physical length of the fiber is changed and a new on-site measurement is required. The repair of a broken fiber is therefore complicated and costly.

SUMMARY

The objective of embodiments of the present disclosure is to provide a method, an apparatus, and a system for measuring an asymmetric delay of a communication path, so as to simplify the measurement of the asymmetric delay of a communication path.

The objective of embodiments of the present disclosure is realized through the following technical solution:

A method for measuring an asymmetric delay of a communication path includes:

sending, by a first node, a first delay measurement message to a second node whose local clock is synchronized with the local clock of the first node;

receiving, by the first node, a second delay measurement message sent by the second node after the second node receives the first delay measurement message, where the second delay measurement message includes the time when the second node receives the first delay measurement message and the time when the second node sends the second delay measurement message;

calculating, according to the time when the first delay measurement message is sent by the first node and the time when the second node receives the first measurement message, a communication path delay in a direction towards the second node;

calculating, according to the time when the second node sends the second delay measurement message and the time when the second measurement message is received by the first node, a communication path delay in a direction leaving the second node; and obtaining a measured value of the asymmetric delay of the communication path according to the communication path delay in the direction towards the second node and the communication path delay in the direction leaving the second node.

An apparatus for measuring an asymmetric delay of a communication path includes:

a sending module, configured to enable a first node to send a first delay measurement message to a second node, wherein a local clock of the second node is synchronized with a local clock of the first node;

a receiving module, configured to enable the first node to receive a second delay measurement message sent by the second node after the second node receives the first delay measurement message, where the second delay measurement message includes the time when the second node receives the first delay measurement message and the time when the second node sends the second delay measurement message;

a first calculating module, configured to calculate, according to the time when the first delay measurement message is sent by the first node and the time when the second node receives the first measurement message, a communication path delay in a direction towards the second node;

a second calculating module, configured to calculate, according to the time when the second node sends the second delay measurement message and the time when the second measurement message is received by the first node, a communication path delay in a direction leaving the second node; and a measuring module, configured to obtain a measured value of the asymmetric delay of the communication path according to the communication path delay in the direction towards the second node and the communication path delay in the direction leaving the second node.

A system for measuring an asymmetric delay of a communication path includes a first node and a second whose local clocks are synchronized, where:

the first node is configured to: send a first delay measurement message to the second node; receive a second delay measurement message which includes the time when the second node receives the first delay measurement message and the time when the second node sends the second delay measurement message; calculate, according to the time when the first delay measurement message is sent by the first node and the time when the second node receives the first delay measurement message, a communication path delay in a direction towards the second node; calculate, according to the time when the second node sends the second delay measurement message and the time when the second delay measurement message is received by the first node, a communication path delay in a direction leaving the second node; and obtain a measured value of the asymmetric delay of the communication path according to the communication path delay in the direction towards the second node and the communication path delay in the direction leaving the second node; and the second node is configured to send the second delay measurement message to the first node after receiving the first delay measurement message, where the second delay measurement message includes the time when the second node receives the first delay measurement message and the time when the second node sends the second delay measurement message.

With the technical solution provided by the embodiments of the present disclosure, the asymmetric delay of a communication path is measured through delay measurement messages, which may simplify the measurement of the asymmetric delay of the communication path.

BRIEF DESCRIPTION OF THE DRAWINGS

To describe the technical solution in the embodiments of the present disclosure or in the prior art more clearly, the following outlines the accompanying drawings required in the description of the embodiments or the prior art. Apparently, the accompanying drawings illustrate only some exemplary embodiments of the present disclosure and persons of ordinary skill in the art can derive other drawings from the accompanying drawings without creative efforts.

DETAILED DESCRIPTION OF THE EMBODIMENTS

To make the objective, features, and merits of the embodiments of the present disclosure more comprehensible, the embodiments of the present disclosure are described below in detail with reference to the accompanying drawings.

An embodiment of the present disclosure is described below with reference to FIG. 1.

Figure 1:
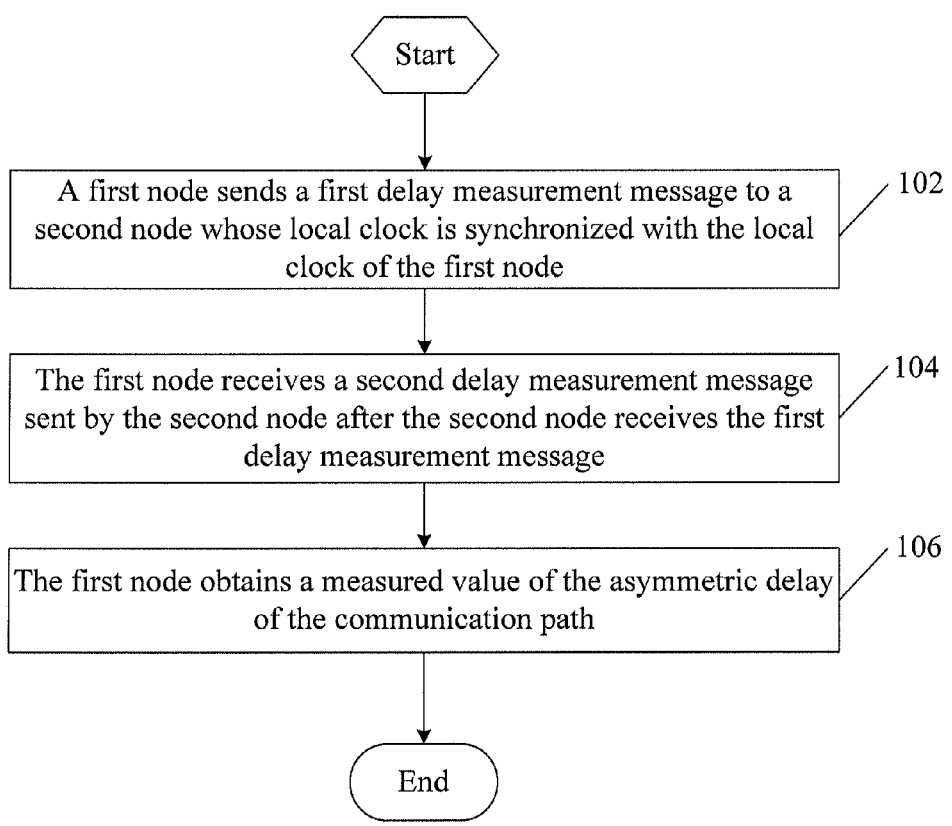
FIG. 1 is a flowchart of a method for measuring an asymmetric delay of a communication path according to an embodiment of the present disclosure.

FIG. 1 is a flowchart of a method for measuring an asymmetric delay of a communication path according to an embodiment of the present disclosure. The method includes the following steps:

102. A first node sends a first delay measurement message to a second node whose local clock is synchronized with the local clock of the first node.

To measure the asymmetric delay of the communication path, the local clocks of the first node and the second node must be synchronized. For example, the GPS is used to calibrate the first node and the second node to make the first node and the second node both be synchronized with the GPS clock. Or, PTP is used to synchronize the local clock of the second node with the local clock of the first node through another communication path between the first node and the second node. The asymmetric delay of the other communication path is already known and may be measured by an OTDR or measured with the method provided by the embodiment of the present disclosure.

For example, the first delay measurement message sent by the first node may include contents in the following table:

| Bits | | | | | | | | Octets | Offset |
|---|---|---|---|---|---|---|---|---|---|
| 7 | 6 | 5 | 4 | 3 | 2 | 1 | 0 | | |
| Header (header see 13.3 of the IEEE1588 protocol) | | | | | | | | 34 | 0 |
| Target Port Identity (target port identity) | | | | | | | | 10 | 34 |
| Tlv Type (message type: 0x2004 first delay measurement message) | | | | | | | | 2 | 44 |
| Length Field (message length: 0x22) | | | | | | | | 2 | 46 |
| Organization Id (organization Id OUI: 0x00259E) | | | | | | | | 3 | 49 |
| Organization SubType (sub-type: 0x001588) | | | | | | | | 3 | 52 |
| Origin Time stamp (time stamp t1) | | | | | | | | 10 | 62 |
| Correction Field (correction field: dwell time) | | | | | | | | 8 | 70 |
| Reserved (reserved) | | | | | | | | 10 | 80 |

The value of the time stamp t1 is the time when the first node sends the first delay measurement message, and this item is an optional item. When the first delay measurement message sent by the first node does not include the time stamp t1, the first node locally stores the time when the first node sends the first delay measurement message. If an intermediate node exists in the communication path being measured, the first delay measurement message received by the second node further includes the dwell time of the first delay measurement message on the intermediate node. When the first delay measurement message traverses a node on the communication path, the node calculates, according to when the first delay measurement message reaches the node and when the message leaves the node, the length of time when the first delay measurement message dwells on the node. The calculation method may be a dwell time calculating method defined by PTP. The node adds the dwell time to the Correction Field, and specifically, adds the dwell time on the node to the dwell time of the first measurement message in the Correction Field, and writes the sum in the Correction Field as the new dwell time. The node may alternatively not calculate the sum but directly writes the dwell time on the node behind the dwell time of the first delay measurement message already existing in the Correction Field.

104. The first node receives a second delay measurement message sent by the second node after the second node receives the first delay measurement message.

After receiving the first delay measurement message, the second node sends a second delay measurement message to the first node. The second delay measurement message includes the time when the second node receives the first delay measurement message and the time when the second node sends the second delay measurement message.

For example, the second delay measurement message sent by the second node may include contents in the following table:

| Bits | | | | | | | | Octets | Offset |
|---|---|---|---|---|---|---|---|---|---|
| 7 | 6 | 5 | 4 | 3 | 2 | 1 | 0 | | |
| Header (header, see 13.3 of the IEEE1588 protocol) | | | | | | | | 34 | 0 |
| Target Port Identity (target port identity) | | | | | | | | 10 | 34 |
| Tlv Type (message type: 0x2005 second delay measurement message) | | | | | | | | 2 | 44 |
| Length Field (message length: 0x36) | | | | | | | | 2 | 46 |
| Organization Id (organization Id OUI: 0x00259E) | | | | | | | | 3 | 49 |
| Organization SubType (sub-type: 0x001588) | | | | | | | | 3 | 52 |
| Request Receipt Time stamp (time stamp t2) | | | | | | | | 10 | 62 |
| Origin Time stamp (time stamp t3) | | | | | | | | 10 | 72 |
| Correction field (correction field: dwell time) | | | | | | | | 8 | 80 |
| Requesting Port Identity (Port ID of the device that sends the response message) | | | | | | | | 10 | 90 |
| Reserved (reserved) | | | | | | | | 10 | 100 |

The value of the time stamp t2 is the time when the first delay measurement message is received by the second node and the value of the time stamp t3 is the time when the second node sends the second delay measurement message.

If an intermediate node exists in the communication path being measured, the second delay measurement message received by the first node further includes the dwell time of the second delay measurement message on the intermediate node. When the second delay measurement message traverses a node on the communication path, the node calculates, according to when the second delay measurement message reaches the node and when the message leaves the node, the length of time when the second delay measurement message dwells on the node. The calculation may be a dwell time calculating method defined by PTP. The node adds the dwell time to the Correction Field, and specifically, adds the dwell time on the node to the dwell time of the second measurement message in the Correction Field, and writes the sum in the Correction Field as the new dwell time. The node may alternatively not calculate the sum but directly writes the dwell time on the node behind the dwell time of the second delay measurement message already existing in the Correction Field.

The second delay measurement message received by the first node may further include the dwell time of the first delay measurement message. Specifically, the second node writes the dwell time in the Correction Field of the received first delay measurement message into the Correction Field of the second delay measurement message as the dwell time of the first delay measurement message. If the dwell time in the Correction Field of the first delay measurement message is not in the form of a sum, the second node may add up the dwell time of the first delay measurement message on various nodes and write the sum in the Correction Field of the second delay measurement message as the dwell time of the first delay measurement message.

If the second delay measurement message received by the first node does not include the dwell time of the first delay measurement message, the dwell time of the first delay measurement message needs to be subtracted from value of the time stamp t2 in the second delay measurement message. This means the value of the time stamp t2 equals the local time of the second node when the second node receives the first delay measurement message minus the dwell time in the Correction Field of the first delay measurement message.

106. The first node obtains a measured value of the asymmetric delay of the communication path.

According to the time when the first node sends the first delay measurement message and the time when the second node receives the first measurement message, the first node calculates the communication path delay in the direction towards the second node. For example, the first node uses the value of the time stamp t2 in the second delay measurement message (the time when the second node receives the first delay measurement message) to subtract the time when the first node sends the first delay measurement time (the local time recorded when the first node sends the first delay measurement message) to get the communication path delay in the direction towards the second node. If the second delay measurement message further includes the dwell time of the first delay measurement message, the first node further needs to subtract the dwell time of the first delay measurement message from the time difference between the time stamp t2 and the time when the first node sends the first delay measurement message to get the communication path delay in the direction towards the second node.

According to the time when the second node sends the second delay measurement message and the time when the first node receives the second measurement message, the first node calculates the communication path delay in the direction leaving the second node. For example, the first node subtracts the value of the time stamp t3 in the second delay measurement message (the time when the second node sends the second delay measurement message) from the time when the first node receives the second delay measurement message (the local time recorded when the first node receives the second delay measurement message) to get the communication path delay in the direction leaving the second node. If the second delay measurement message further includes the dwell time of the second delay measurement message, the first node further needs to subtract the dwell time of the second delay measurement message from the time difference between the time when the first node receives the second delay measurement message and the time stamp t3 to get the communication path delay in the direction leaving the second node.

The first node obtains a measured value of the asymmetric delay of the communication path according to the communication path delay in the direction towards the second node and the communication path delay in the direction leaving the second node. For example, measured value of the asymmetric delay of the communication path=(Communication path delay in the direction leaving the second node−Communication path delay in the direction towards the second node)/2.

Persons of ordinary skill in the art may understand that, the time stamp processing method is the same as that for PTP messages when the first delay measurement message or the second delay measurement message needs to include a time stamp. The calculation of dwell time on other nodes on the communication path may be the same as the Transparent Clock (TC) mode in PTP.

Another embodiment of the present disclosure is described with reference to FIG. 2.

Figure 2:
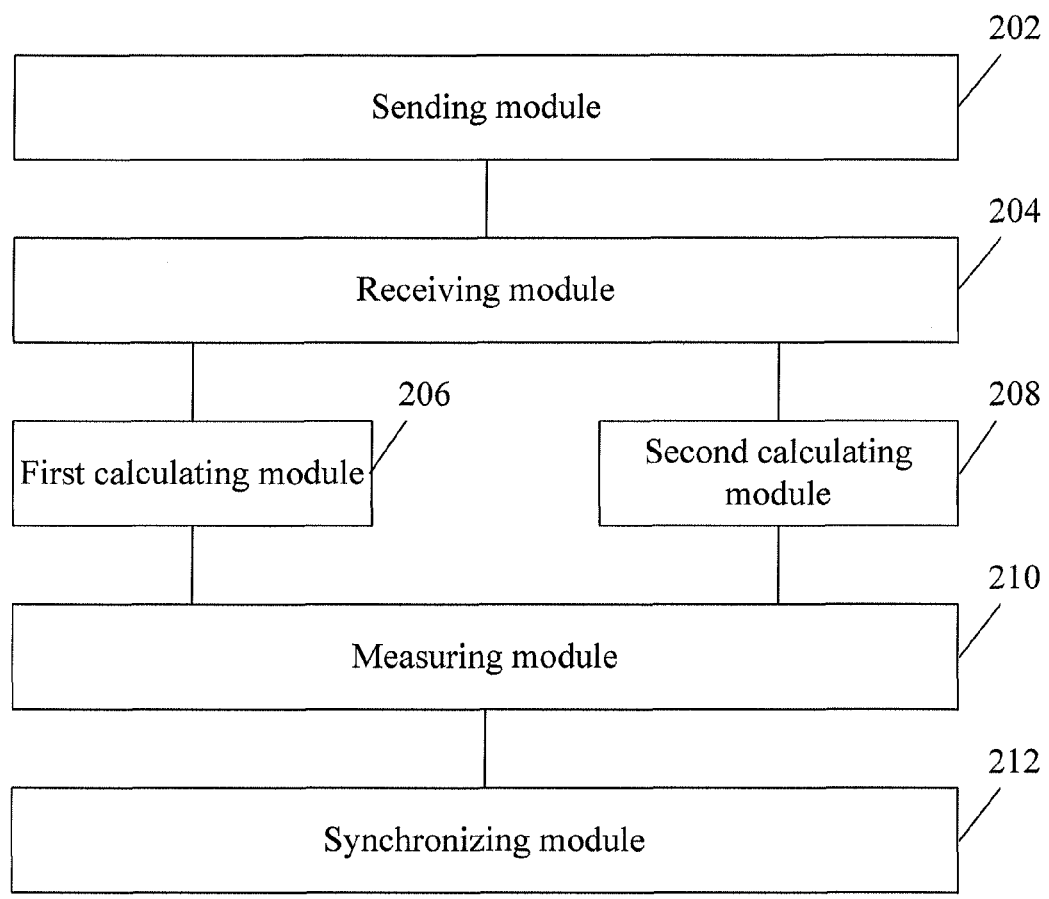
FIG. 2 is a block diagram of an apparatus for measuring an asymmetric delay of a communication path according to another embodiment of the present disclosure.

FIG. 2 is a block diagram of an apparatus for measuring an asymmetric delay of a communication path according to another embodiment of the present disclosure. The apparatus includes a sending module 202, a receiving module 204, a first calculating module 206, a second calculating module 208, and a measuring module 210.

The sending module 202 is configured to enable a first node to send a first delay measurement message to a second node whose local clock is synchronized with the local clock of the first node.

The apparatus for measuring an asymmetric delay of a communication path is disposed in the first node. To measure the asymmetric delay of the communication path, the local clocks of the first node and the second node must be synchronized. For example, the GPS is used to calibrate the first node and the second node to make the first node and the second node both synchronized with the GPS clock. Or, PTP is used to synchronize the local clock of the second node with the local clock of the first node through another communication path between the first node and the second node. The asymmetric delay of the other communication path is already known and may be measured by an OTDR or measured with the method provided by the embodiment of the present disclosure.

When PTP is used to synchronize the local clock of the second node with the local clock of the first node, the apparatus for measuring an asymmetric delay of a communication path further includes a synchronizing module 212, configured to use the PTP protocol to synchronize the local clocks of the second node and the first node through another communication path between the first node and the second node.

Optionally, the first delay measurement message sent by the first node may include a time stamp t1, whose value is the time when the first node sends the first delay measurement message.

If there is an intermediate node in the measured communication path, the first delay measurement message received by the second node further includes the dwell time of the first delay measurement message. When the first delay measurement message traverses a node on the communication path, the node calculates, according to when the first delay measurement message reaches the node and when the message leaves the node, the length of time when the first delay measurement message dwells on the node. The calculation may be performed according to the dwell time calculating method defined by PTP. The node adds the dwell time to the Correction Field, and specifically, adds the dwell time on the node to the dwell time of the first measurement message in the Correction Field, and writes the sum in the Correction Field as the new dwell time. The node may alternatively not calculate the sum but directly writes the dwell time on the node behind the dwell time of the first delay measurement message already existing in the Correction Field.

The receiving module 204 is configured to enable the first node to receive a second delay measurement message sent by the second node after the second node receives the first delay measurement message, where the second delay measurement message includes the time when the second node receives the first delay measurement message and the time when the second node sends the second delay measurement message.

After receiving the first delay measurement message, the second node sends a second delay measurement message to the first node. For example, the second delay measurement message includes a time stamp t2 and a time stamp t3. The value of the time stamp t2 is the time when the second node receives the first delay measurement message and the value of the time stamp t3 is the time when the second node sends the second delay measurement message.

If there is an intermediate node in the measured communication path, the second delay measurement message received by the first node further includes the dwell time of the second delay measurement message. When the second delay measurement message traverses a node on the communication path, the node calculates, according to when the second delay measurement message reaches the node and when the message leaves the node, the length of time when the second delay measurement message dwells on the node. The calculation may be performed according to the dwell time calculating method defined by PTP. The node adds the dwell time to the Correction Field, and specifically, adds the dwell time on the node to the dwell time of the second measurement message in the Correction Field, and writes the sum in the Correction Field as the new dwell time. The node may alternatively not calculate the sum but directly writes the dwell time on the node behind the dwell time of the second delay measurement message already existing in the Correction Field.

The second delay measurement message received by the first node may further include the dwell time of the first delay measurement message. Specifically, the second node writes the dwell time in the Correction Field of the received first delay measurement message into the Correction Field of the second delay measurement message as the dwell time of the first delay measurement message. If the dwell time in the Correction Field of the first delay measurement message is not in the form of a sum, the second node may add up the dwell time of the first delay measurement message on different nodes and write the sum in the Correction Field of the second delay measurement message as the dwell time of the first delay measurement message.

If the second delay measurement message received by the first node does not include the dwell time of the first delay measurement message, the dwell time of the first delay measurement message needs to be subtracted from the time stamp t2 in the second delay measurement message. This means the value of the time stamp t2 equals the local time of the second node when the second node receives the first delay measurement message minus the dwell time in the Correction Field of the first delay measurement message.

The first calculating module 206 is configured to calculate, according to the time when the first node sends the first delay measurement message and the time when the second node receives the first measurement message, the communication path delay in the direction towards the second node.

For example, the first calculating module 206 uses the value of the time stamp t2 in the second delay measurement message (the time when the second node receives the first delay measurement message) to subtract the time when the first node sends the first delay measurement time (the local time recorded when the first node sends the first delay measurement message) to get the communication path delay in the direction towards the second node. If the second delay measurement message further includes the dwell time of the first delay measurement message, the first calculating module 206 further needs to subtract the dwell time of the first delay measurement message from the time difference between the time stamp t2 and the time when the first node sends the first delay measurement message to get the communication path delay in the direction towards the second node.

The second calculating module 208 is configured to calculate, according to the time when the second node sends the second delay measurement message and the time when the first node receives the second measurement message, the communication path delay in the direction leaving the second node.

For example, the second calculating module 208 subtracts the value of the time stamp t3 in the second delay measurement message (the time when the second node sends the second delay measurement message) from the time when the first node receives the second delay measurement message (the local time recorded when the first node receives the second delay measurement message) to get the communication path delay in the direction leaving the second node. If the second delay measurement message further includes the dwell time of the second delay measurement message, the second calculating module 208 further needs to subtract the dwell time of the second delay measurement message from the time difference between the time when the first node receives the second delay measurement message and the time stamp t3 to get the communication path delay in the direction leaving the second node.

The measuring module 210 is configured to obtain a measured value of the asymmetric delay of the communication path according to the communication path delay in the direction towards the second node and the communication path delay in the direction leaving the second node.

For example, the measuring module 210 obtains the measured value of the asymmetric delay of the communication path according to the formula: measure value of asymmetric delay of the communication path=(Communication path delay in the direction leaving the second node−Communication path delay in the direction towards the second node)/2.

Still another embodiment of the present disclosure is described with reference to FIG. 3.

Figure 3:
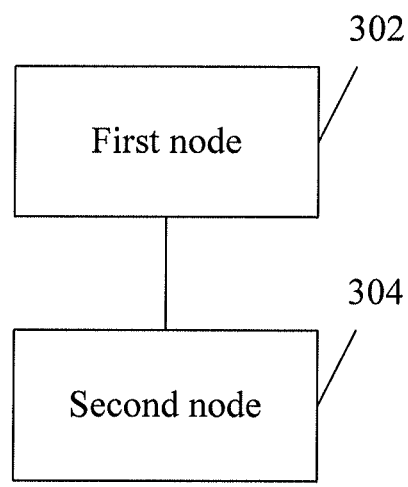
FIG. 3 is a block diagram of a system for measuring an asymmetric delay of a communication path according to still another embodiment of the present disclosure.

FIG. 3 is a block diagram of a system for measuring an asymmetric delay of a communication path according to an embodiment of the present disclosure. The system includes a first node 302 and a second node 304, where the clocks of the two nodes are synchronized.

To measure the asymmetric delay of the communication path, the local clocks of the first node 302 and the second node 304 must be synchronized. For example, the GPS is used to calibrate the first node 302 and the second node 302 to make the first node 302 and the second node 304 both synchronized with the GPS clock. Or, PTP is used to synchronize the local clock of the second node 304 with the local clock of the first node 302 through another communication path between the first node 302 and the second node 304. The asymmetric delay of the other communication path is already known and may be measured by an OTDR or measured with the method provided by the embodiment of the present disclosure.

The first node 302 is configured to: send a first delay measurement message to the second node 304; receive a second delay measurement message which includes the time when the second node 304 receives the first delay measurement message and the time when the second node 304 sends the second delay measurement message; calculate, according to the time when the first node 302 sends the first delay measurement message and the time when the second node receives the first delay measurement message, the communication path delay in the direction towards the second node 304; calculate, according to the time when the second node 304 sends the second delay measurement message and the time when the first node 302 receives the second delay measurement message, the communication path delay in the direction leaving the second node 304; and obtain a measured value of the asymmetric delay of the communication path according to the difference between the communication path delay in the direction towards the second node 304 and the communication path delay in the direction leaving the second node 304.

The second node 304 is configured to send the second delay measurement message to the first node 302 after receiving the first delay measurement message, where the second delay measurement message includes the time when the second node 304 receives the first delay measurement message and the time when the second node 304 sends the second delay measurement message.

For example, the first delay measurement message sent by the first node 302 to the second node 304 may include an optional time stamp t1 whose value is the time when the first node 302 sends the first delay measurement message.

If there is an intermediate node in the measured communication path, the first delay measurement message received by the second node further includes the dwell time of the first delay measurement message. When the first delay measurement message traverses a node on the communication path, the node calculates, according to when the first delay measurement message reaches the node and when the message leaves the node, the length of time when the first delay measurement message dwells on the node. The calculation may be performed according to the dwell time calculating method defined by PTP. The node adds the dwell time to the Correction Field, and specifically, adds the dwell time on the node to the dwell time of the first measurement message in the Correction Field, and writes the sum in the Correction Field as the new dwell time. The node may alternatively not calculate the sum but directly writes the dwell time on the node behind the dwell time of the first delay measurement message already existing in the Correction Field.

After receiving the first delay measurement message, the second node 304 sends the second delay measurement message to the first node 302. For example, the second delay measurement message includes a time stamp t2 and a time stamp t3. The value of the time stamp t2 is the time when the second node 304 receives the first delay measurement message and the value of the time stamp t3 is the time when the second node 304 sends the second delay measurement message.

If there is an intermediate node in the measured communication path, the second delay measurement message received by the first node further includes the dwell time of the second delay measurement message. When the second delay measurement message traverses a node on the communication path, the node calculates, according to when the second delay measurement message reaches the node and when the message leaves the node, the length of time when the second delay measurement message dwells on the node.

The calculation may be performed according to the dwell time calculating method defined by PTP. The node adds the dwell time to the Correction Field, and specifically, adds the dwell time on the node to the dwell time of the second measurement message in the Correction Field, and writes the sum in the Correction Field as the new dwell time. The node may alternatively not calculate the sum but directly writes the dwell time on the node behind the dwell time of the second delay measurement message already existing in the Correction Field.

The second delay measurement message received by the first node may further include the dwell time of the first delay measurement message. Specifically, the second node 304 writes the dwell time in the Correction Field of the received first delay measurement message into the Correction Field of the second delay measurement message as the dwell time of the first delay measurement message. If the dwell time in the Correction Field of the first delay measurement message is not in the form of a sum, the second node 304 may add up the dwell time of the first delay measurement message on different nodes and write the sum in the Correction Field of the second delay measurement message as the dwell time of the first delay measurement message.

If the second delay measurement message received by the first node does not include the dwell time of the first delay measurement message, the dwell time of the first delay measurement message needs to be subtracted from the time stamp t2 in the second delay measurement message. This means the value of the time stamp t2 equals the local time of the second node 304 when the second node 304 receives the first delay measurement message minus the dwell time in the Correction Field of the first delay measurement message.

According to the time when the first node 302 sends the first delay measurement message and the time when the second node 304 receives the first measurement message, the first node 302 calculates the communication path delay in the direction towards the second node 304. For example, the first node 302 uses the value of the time stamp t2 in the second delay measurement message (the time when the second node 304 receives the first delay measurement message) to subtract the time when the first node 302 sends the first delay measurement time (the local time recorded when the first node 302 sends the first delay measurement message) to get the communication path delay in the direction towards the second node 304. If the second delay measurement message further includes the dwell time of the first delay measurement message, the first node 302 further needs to subtract the dwell time of the first delay measurement message from the time difference between the time stamp t2 and the time when the first node 302 sends the first delay measurement message to get the communication path delay in the direction towards the second node 304.

According to the time when the second node 304 sends the second delay measurement message and the time when the first node 302 receives the second measurement message, the first node 302 calculates the communication path delay in the direction leaving the second node 304. For example, the first node 302 subtracts the value of the time stamp t3 in the second delay measurement message (the time when the second node 304 sends the second delay measurement message) from the time when the first node 302 receives the second delay measurement message (the local time recorded when the first node 302 receives the second delay measurement message) to get the communication path delay in the direction leaving the second node 304. If the second delay measurement message further includes the dwell time of the second delay measurement message, the first node 302 further needs to subtract the dwell time of the second delay measurement message from the time difference between the time when the first node 302 receives the second delay measurement message and the time stamp t3 to get the communication path delay in the direction leaving the second node 304.

The first node 302 obtains the measured value the asymmetric delay of the communication path according to the difference between the communication path delay in the direction towards the second node 304 and the communication path delay in the direction leaving the second node 304. For example, measured value of the asymmetric delay of the communication path=(Communication path delay in the direction leaving the second node 304−Communication path delay in the direction towards the second node 304)/2.

A specific application scenario of the present disclosure is described with reference to FIG. 4.

Figure 4:
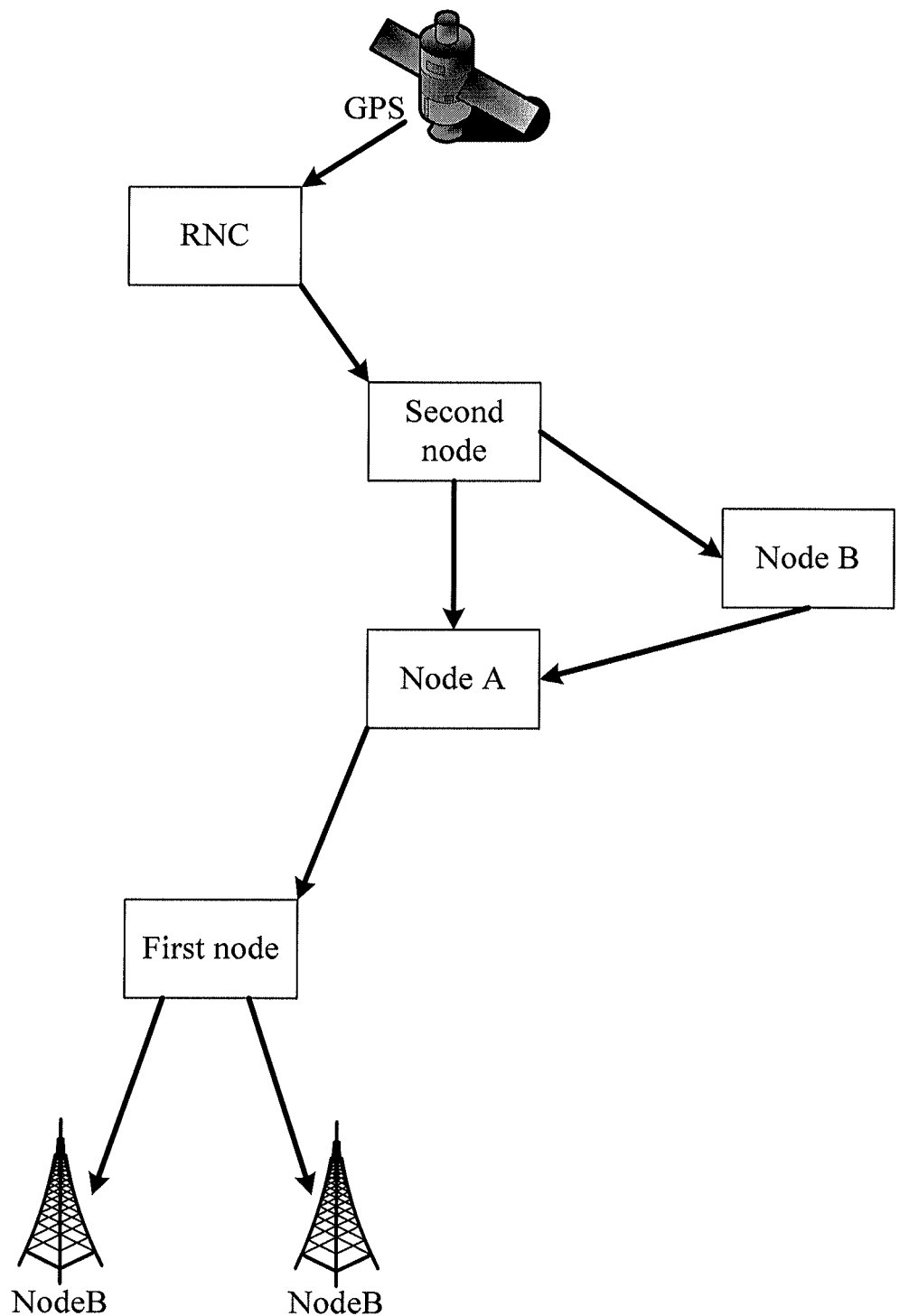
FIG. 4 is a schematic diagram of a specific application scenario of the present disclosure.

FIG. 4 is a schematic diagram of a specific application of the present disclosure, where a Radio Network Controller (RNC) is connected to NodeBs through an IP network.

In the scenario, the asymmetric delay of the communication path between a first node and a second needs to be measured. There are two communication paths between the first node and the second node, specifically, "first node—node A—second node" and "first node—node A—node B—second node".

If the asymmetric delays of both paths are not measured, the local clock of the first node and the local clock of the second node must first be synchronized through approaches like the GPS. Then, the method and apparatuses in the embodiments illustrated in FIG. 1 to FIG. 3 are used to measure the asymmetric delay of the communication path between the first node and the second node. For example, the first node sends a first delay measurement message to the second node along the communication path "first node—node A—second node", receives a second delay measurement message sent by the second node along the same communication path, and measures the asymmetric delay of the communication path "first node—node A—second node" according to the time when the first delay measurement message is sent, the time when the second delay measurement message is received, and the time stamps and dwell time in the second delay measurement message.

After the asymmetric delay of one communication path between the first node and second node is measured, PTP may be used to synchronize the local clock of the first node and the local clock of the second node according to the communication path. For example, after the asymmetric delay of the communication path "first node—node A—second node" is measured according to the embodiments shown in FIG. 1 to FIG. 3, the first node and the second node exchange PTP messages along the communication path "first node—node A—second node" to synchronize the local clock of the first node and the local clock of the second node. Or, after an OTDR is used to measure the asymmetric delay of the communication path "first node—node A—second node", the first node and the second node exchange PTP messages along the communication path "first node—node A—second node" to synchronize the local clock of the first node and the local clock of the second node.

After the local clock of the first node and the local clock of the second node are synchronized along the communication path "first node—node A—second node" through PTP, the asymmetric delay of the communication path "first node—node A—node B—second node" may be measured according to the embodiments shown in FIG. 1 to FIG. 3.

By analogy, provided that the local clock of the first node and the local clock of the second node are synchronized through the GPS, or that the asymmetric delay of one communication path between the first node and the second node is obtained by any means, the asymmetric delays of all communication paths between the first node and the second node may be measured according to the solution of the embodiments of the present disclosure.

If one communication path between the first node and the second node (for example "first node—node A—second node") fails, the first node and the second node exchange PTP messages over another communication path (for example "first node—node A—node B—second node" to synchronize the local clock of the first node and the local clock of the second node. After the failed communication path recovers, because the asymmetric delay of the communication path may have changed, the asymmetric delay must be re-measured. In this case, it is unnecessary to use the GPS or OTDR to measure the asymmetric delay of the communication path and instead, the new asymmetric delay of the communication path may be measured with the method provided by the embodiment of the present disclosure.

With the technical solution of the embodiments of the present disclosure, the asymmetric delay of a communication path is measured through delay measurement messages, which may simplify the measurement of the asymmetric delay of the communication path. Moreover, after a failed communication path recovers, no manual measurement is required to get the new asymmetric delay of the communication path.

Persons of ordinary skills in the art may understand that all or part of the steps in the method provided in the foregoing embodiments of the present disclosure can be implemented by hardware under the instruction of a program. The program may be stored in a computer readable storage medium, such as a Read Only Memory (ROM), a Random Access Memory (RAM), a magnetic disk, or a Compact Disk-Read Only Memory (CD-ROM).

Detailed above are only exemplary embodiments of the present disclosure, but the scope of the present disclosure is not limited thereto. Any modification or substitution readily conceivable by those skilled in the art within the scope of the technology disclosed by the present disclosure shall fall within the scope of the present disclosure. Therefore, the scope of the present disclosure is subject to the appended claims.

What is claimed is:

1. A method for measuring an asymmetric delay of a communication path, comprising:
    sending, by a first node, a first delay measurement message to a second node, wherein a local clock of the second node is synchronized with a local clock of the first node;
    receiving, by the first node, a second delay measurement message from the second node after the second node receives the first delay measurement message, wherein the second delay measurement message comprises a time when the second node receives the first delay measurement message and a time when the second node sends the second delay measurement message;
    calculating, according to the time when the first delay measurement message is sent by the first node and the time when the second node receives the first measurement message, a communication path delay in a direction towards the second node;
    calculating, according to the time when the second node sends the second delay measurement message and the time when the second measurement message is received by the first node, a communication path delay in a direction leaving the second node; and
    obtaining a measured value of the asymmetric delay of the communication path according to the communication path delay in the direction towards the second node and the communication path delay in the direction leaving the second node, wherein the measured value of the asymmetric delay of the communication path is equal to ½ of the difference between the communication path delay in the direction leaving the second node and the communication path delay in the direction towards the second node.

2. The method according to claim 1, wherein, when an intermediate node exists on the communication path,
    the first delay measurement message received by the second node further comprises a dwell time of the first delay measurement message on the intermediate node;
    the time when the second node receives the first delay measurement message is a local time of the second node when the second node receives the first delay measurement message minus the dwell time of the first delay measurement message on the intermediate node;
    the second delay measurement message received by the first node further comprises a dwell time of the second delay measurement message on the intermediate node; and
    calculation of the communication path delay in the direction leaving the second node further comprises subtracting the dwell time of the second delay measurement message on the intermediate node.

3. The method according to claim 1, wherein, when an intermediate node is on the communication path,
    the first delay measurement message received by the second node further comprises a dwell time of the first delay measurement message on the intermediate node;
    the second delay measurement message received by the first node further comprises the dwell time of the first delay measurement message on the intermediate node and a dwell time of the second delay measurement message on the intermediate node;
    calculation of the communication path delay in the direction towards the second node further comprises subtracting the dwell time of the first delay measurement message on the intermediate node; and
    calculation of the communication path delay in the direction leaving the second node further comprises subtracting the dwell time of the second delay measurement message on the intermediate node.

4. The method according to claim 1, wherein synchronization of the local clock of the second node with the local clock of the first node comprises: using a Precision Time Protocol (PTP) to synchronize the local clock of the second node with the local clock of the first node through another communication path between the first node and the second node.

5. The method according to claim 2, wherein synchronization of the local clock of the second node with the local clock of the first node comprises: using a Precision Time Protocol (PTP) to synchronize the local clock of the second node with the local clock of the first node through another communication path between the first node and the second node.

6. The method according to claim 3, wherein synchronization of the local clock of the second node with the local clock of the first node comprises: using a Precision Time Protocol (PTP) to synchronize the local clock of the second node with the local clock of the first node through another communication path between the first node and the second node.

7. An apparatus for measuring an asymmetric delay of a communication path, comprising:

a sending module configured to cause a first node to send a first delay measurement message to a second node, wherein a local clock of the second node is synchronized with a local clock of the first node;
a receiving module configured to cause the first node to receive a second delay measurement message from the second node after the second node receives the first delay measurement message, wherein the second delay measurement message comprises a time when the second node receives the first delay measurement message and a time when the second node sends the second delay measurement message;
a first calculating module configured to calculate, according to the time when the first delay measurement message is sent by the first node and the time when the second node receives the first measurement message, a communication path delay in a direction towards the second node;
a second calculating module configured to calculate, according to the time when the second node sends the second delay measurement message and the time when the second measurement message is received by the first node, a communication path delay in a direction leaving the second node; and
a measuring module configured to obtain a measured value of the asymmetric delay of the communication path according to the communication path delay in the direction towards the second node and the communication path delay in the direction leaving the second node, wherein the measured value of the asymmetric delay of the communication path is equal to ½ of the difference between the communication path delay in the direction leaving the second node and the communication path delay in the direction towards the second node.

8. The apparatus according to claim 7, wherein, when an intermediate node exists on the communication path,
the first delay measurement message received by the second node further comprises a dwell time of the first delay measurement message on the intermediate node;
the time when the second node receives the first delay measurement message is the local time of the second node when the second node receives the first delay measurement message minus the dwell time of the first delay measurement message on the intermediate node;
the second delay measurement message received by the first node further comprises a dwell time of the second delay measurement message received by the first node on the intermediate node; and
the second calculating module is configured to calculate the communication path delay in the direction leaving the second node according to the time when the second node sends the second delay measurement message, the time when the second delay measurement time is received by the first node, and the dwell time of the second delay measurement message on the intermediate node.

9. The apparatus according to claim 7, wherein, when an intermediate node exists on the communication path of the second node,
the first delay measurement message received by the second node further comprises a dwell time of the first delay measurement message on the intermediate node;
the second delay measurement message received by the first node further comprises the dwell time of the first delay measurement message on the intermediate node and a dwell time of the second delay measurement message on the intermediate node;

the first calculating module is configured to calculate the communication path delay in the direction towards the second node according to the time when the first delay measurement message is sent by the first node, the time when the second node receives the first delay measurement time, and the dwell time of the first delay measurement message on the intermediate node; and
the second calculating module is configured to calculate the communication path delay in the direction leaving the second node according to the time when the second node sends the second delay measurement message, the time when the second delay measurement time is received by the first node, and the dwell time of the second delay measurement message on the intermediate node.

10. The apparatus according to claim 7, further comprising:
a synchronization module configured to use a Precision Time Protocol (PTP) to synchronize the local clock of the second node with the local clock of the first node through another communication path between the first node and the second node.

11. The apparatus according to claim 8, further comprising:
a synchronization module configured to use a Precision Time Protocol (PTP) to synchronize the local clock of the second node with the local clock of the first node through another communication path between the first node and the second node.

12. The apparatus according to claim 9, further comprising:
a synchronization module configured to use a Precision Time Protocol (PTP) to synchronize the local clock of the second node with the local clock of the first node through another communication path between the first node and the second node.

13. A system for measuring an asymmetric delay of a communication path, comprising:
a first node and a second node, wherein local clocks of the first node and the second node are synchronized,
the first node is configured to: send a first delay measurement message to the second node; receive a second delay measurement message which comprises a time when the second node receives the first delay measurement message and a time when the second node sends the second delay measurement message; calculate, according to a time when the first delay measurement message is sent by the first node and the time when the second node receives the first delay measurement message, a communication path delay in a direction towards the second node; calculate, according to the time when the second node sends the second delay measurement message and a time when the second delay measurement message is received by the first node, a communication path delay in a direction leaving the second node; and obtain a measured value of the asymmetric delay of the communication path according to the communication path delay in the direction towards the second node and the communication path delay in the direction leaving the second node, wherein the measured value of the asymmetric delay of the communication path is equal to ½ of the difference between the communication path delay in the direction leaving the second node and the communication path delay in the direction towards the second node; and
the second node is configured to send the second delay measurement message to the first node after receiving the first delay measurement message, wherein the second delay measurement message comprises the time when the second node receives the first delay measurement message and the time when the second node sends the second delay measurement message.

14. The system according to claim 13, further comprising an intermediate node, wherein the intermediate node is on the communication path, the intermediate node is configured to: calculate a dwell time of the first delay measurement message on the intermediate node according to when the first delay measurement message reaches the intermediate node and when the first delay measurement message leaves the intermediate node; add the dwell time of the first delay measurement message on the intermediate node to the first delay measurement message; calculate a dwell time of the second delay measurement message on the intermediate node according to when the second delay measurement message reaches the intermediate node and when the second delay measurement message leaves the intermediate node; and add the dwell time of the second delay measurement message on the intermediate node to the second delay measurement message.

\* \* \* \* \*

UNITED STATES PATENT AND TRADEMARK OFFICE
CERTIFICATE OF CORRECTION

| | | |
|---|---|---|
| PATENT NO. | : 8,750,356 B2 | Page 1 of 1 |
| APPLICATION NO. | : 13/406280 | |
| DATED | : June 10, 2014 | |
| INVENTOR(S) | : Song Liu | |

It is certified that error appears in the above-identified patent and that said Letters Patent is hereby corrected as shown below:

<u>On the Title Page</u>

Item (12), should read as follows: --Liu--.

Left column, item (75) Inventor, replace "Song Wang," with --Song Liu,--.

Signed and Sealed this
Fourteenth Day of October, 2014

Michelle K. Lee
*Deputy Director of the United States Patent and Trademark Office*